United States Patent
Gallagher et al.

(10) Patent No.: US 8,527,183 B2
(45) Date of Patent: Sep. 3, 2013

(54) SYSTEM AND METHOD FOR CONTROLLING THE FUEL INJECTION EVENT IN AN INTERNAL COMBUSTION ENGINE

(75) Inventors: Shawn M. Gallagher, Erie, PA (US); Roy Primus, Niskayuna, NY (US); Bhaskar Tamma, Karnataka (IN); Jennifer Topinka, Waukesha, WI (US); Robert Mischler, Erie, PA (US); Rajani Boddu, Erie, PA (US)

(73) Assignee: General Electric Company, Schenectady, NY (US)

( * ) Notice: Subject to any disclaimer, the term of this patent is extended or adjusted under 35 U.S.C. 154(b) by 982 days.

(21) Appl. No.: 12/605,498

(22) Filed: Oct. 26, 2009

(65) Prior Publication Data

US 2010/0043753 A1   Feb. 25, 2010

Related U.S. Application Data

(63) Continuation-in-part of application No. 11/858,345, filed on Sep. 20, 2007, now Pat. No. 7,630,823.

(51) Int. Cl.
*F02D 41/38*   (2006.01)
*F02D 35/02*   (2006.01)

(52) U.S. Cl.
USPC .......................................... 701/104; 123/456

(58) Field of Classification Search
USPC ................................................ 701/104, 105
See application file for complete search history.

(56) References Cited

U.S. PATENT DOCUMENTS

| 6,158,416 | A  | 12/2000 | Chen et al. |
| 6,295,816 | B1 | 10/2001 | Gallagher et al. |
| 7,127,345 | B2 | 10/2006 | Chen et al. |

(Continued)

FOREIGN PATENT DOCUMENTS

| EP | 0088716 A2 | 9/1983 |
| EP | 1348854 A  | 10/2003 |

(Continued)

OTHER PUBLICATIONS

PCT International Search Report and Written Opinion issued in connection with corresponding International Application No. PCT/US2010/048856 on Feb. 8, 2011.

(Continued)

*Primary Examiner* — Stephen K Cronin
*Assistant Examiner* — Arnold Castro
(74) *Attorney, Agent, or Firm* — GE Global Patent Operation; John A. Kramer (57) ABSTRACT

A controller, in electrical communication with the one or more of the injectors and a high-pressure fuel pump, generates a first signal responsive to which the valve in the injector opens or closes and a second signal responsive to which the high-pressure fuel pump increases or decreases the pressure level in the fuel accumulator. The system may also include one or more sensors to detect a pressure within the air manifold and to detect the pressure within the fuel accumulator. The controller is programmed to calculate an in-cylinder gas pressure. When the engine is operating at a maximum engine load and the in-cylinder gas pressure reaches or exceeds a maximum pressure limit, the controller transmits one or more signals to adjust the fuel injection timing and/or adjust the pressure in the fuel accumulator to maintain $NO_x$ and fuel consumption within acceptable limits.

13 Claims, 7 Drawing Sheets

(56) References Cited

U.S. PATENT DOCUMENTS

| | | | |
|---|---|---|---|
| 7,150,262 B2 * | 12/2006 | Demura et al. | 123/305 |
| 7,630,823 B2 * | 12/2009 | Gallagher et al. | 701/105 |
| 7,693,646 B2 * | 4/2010 | Moriya | 701/104 |
| 2002/0195086 A1 * | 12/2002 | Beck et al. | 123/435 |
| 2003/0000499 A1 * | 1/2003 | Doelker et al. | 123/435 |
| 2004/0025849 A1 * | 2/2004 | West et al. | 123/480 |
| 2006/0178800 A1 | 8/2006 | Chen et al. | |
| 2006/0219214 A1 | 10/2006 | Okude et al. | |
| 2006/0231066 A1 * | 10/2006 | Demura et al. | 123/305 |
| 2007/0250255 A1 * | 10/2007 | Matekunas et al. | 701/104 |
| 2008/0201056 A1 * | 8/2008 | Moriya | 701/103 |
| 2009/0078236 A1 * | 3/2009 | Gallagher et al. | 123/480 |
| 2009/0159046 A1 * | 6/2009 | Moriya | 123/435 |
| 2009/0164104 A1 * | 6/2009 | Wermuth et al. | 701/105 |
| 2010/0023240 A1 * | 1/2010 | Haskara et al. | 701/103 |

FOREIGN PATENT DOCUMENTS

| | | |
|---|---|---|
| EP | 1566533 A1 | 8/2005 |
| WO | 2005028837 A2 | 3/2005 |
| WO | 2009038885 A1 | 3/2009 |

OTHER PUBLICATIONS

Grizzle J. W. et al., "Improved Cylinder Air Charge Estimation for Transient Air Fuel Ratio Control", 19940629; 19940629-19940701, vol. 2, Jun. 29, 1994, pp. 1568-1573, XP010304482.

* cited by examiner

SYSTEM AND METHOD FOR CONTROLLING THE FUEL INJECTION EVENT IN AN INTERNAL COMBUSTION ENGINE

CROSS-REFERENCE TO RELATED APPLICATIONS

This application claims priority to and is a Continuation-In-Part of U.S. application Ser. No. 11/858,345 filed Sep. 20, 2007 now U.S. Pat. No. 7,630,823, and incorporated herein by reference in its entirety.

BACKGROUND OF THE INVENTION

An embodiment of the invention disclosed herein relates generally to internal combustion engines. More specifically, the invention pertains to fuel injection systems and methods that control a fuel injection event in an internal combustion engine.

Improving fuel efficiency while meeting emissions requirements is an ongoing effort in the design of internal combustion engines, including diesel engines. Typically, the reduction of emissions, such as nitrous oxide, is accompanied by increased fuel consumption. For locomotive engines in the United States, emissions compliance must be maintained over a wide range of altitudes and ambient temperatures. Accordingly, a fuel injection strategy that works well at lower altitudes may not be as desirable at high altitudes, because for example, the injection may result in emissions that fail to comply with appropriate regulations.

Traditionally, operating parameters are changed in accordance with ambient conditions such as ambient temperature and pressure, and operating conditions such as intake manifold temperature and manifold pressure, to optimize fuel efficiency. More specifically, parameters such as injection timing, engine speed, and engine load have been varied in consideration of these ambient conditions. The hardware design of high-pressure unit pump fuel systems (also referred to as "unit pump systems"), for diesel internal combustion engines, limits the options available for selecting an effective strategy. The injection must occur within a defined window of the top dead center position of the piston. That is, the injection must be made when injection pressure is available, which is generally within a fifty degree window around piston top dead center.

In addition, the injection pressure is fixed or predetermined for any given speed of the locomotive engine, and is not variable at a fixed speed and horsepower. In a unit pump system, a controller and solenoid flow control valve controls the flow of fuel from a low-pressure fuel reservoir into a high-pressure fuel pump and a high-pressure line, which is connected to a fuel injector. A needle valve disposed within the injector is mechanically set to open when the pressure of the high-pressure fuel line reaches a predetermined pressure. When the pressure in the high-pressure line drops below a predetermined pressure, the needle closes, thus ending injection.

A subsequent injection is not made until the pressure within the high-pressure line reaches the predetermined pressure level to open the injection valve in the fuel injector. In this type of system, the injection event is dependant directly upon the amount of pressure in the high-pressure line. Therefore, the unit pump system has control only over the timing of the injection, or when the injection is made relative to the top dead center position of the piston. Moreover, the injection pressure is the same for each given notch and cannot be independently varied for different speeds or horsepower of the locomotive. In addition, because pressure between injections must be revived, the current unit pump fuel systems used in locomotive diesel engines are limited to a single injection per injection cycle.

Other fuel systems such as the common rail fuel systems allow for more flexibility in developing fuel injection strategies. The injection event (or opening of the needle valve in the injector) is controlled by an electronic control unit (controller) and solenoid, and is not dependent on in-cycle pressure build up in the high-pressure fuel lines leading to the injector. For a common rail fuel system, the fuel supply pressure to the injector is maintained at a relatively constant, high-pressure level throughout the engine cycle. Such advanced fuel systems allow for fuel injection to take place at any time during the piston cycle and allow for multiple injections during a single cycle. In addition, the supply pressure to the injectors can be changed independent of engine speed and engine load.

Land vehicles, such as locomotives, which travel over significant distances and at varying altitudes, may experience changes to air density in the intake air manifold. Accordingly, some current fuel injection systems, including unit pump systems, consider the manifold air density in determining an injection strategy. More specifically, a locomotive controller contains a database that includes data representative of a maximum volume of fuel to be injected at predetermined engine speeds, and/or engine loads, and a predetermined manifold air pressure. Such a system is disclosed in the commonly owned U.S. Pat. No. 7,127,345.

The locomotive has sensors that detect manifold air pressure, manifold temperature, and ambient barometric pressure. Based on measurements taken by these sensors a manifold air density is estimated. If the volume of fuel injected at a given engine speed and at a given manifold air pressure exceeds a predetermined volume limit, the controller adjusts the fuel demand of the locomotive to reduce horsepower. In response to the reduced horsepower, the controller alters the duration of the injection so less fuel is injected during an engine cycle. However, as noted above the unit pump systems are limited in that the injection pressure and the number of injections during an engine cycle are not variable. In addition, the calculation of the air manifold density assumes that the condition of air manifold density is similar to a density of gas within the cylinder, which may not be accurate.

BRIEF DESCRIPTION OF THE INVENTION

An embodiment of a high-pressure fuel injection system for controlling the fuel injection event in an internal combustion engine estimates an in-cylinder gas density and selects a fuel injection strategy based on this estimation. The fuel injection system comprises a high-pressure fuel pump in fluid communication with a low pressure fuel reservoir, a high-pressure fuel accumulator in fluid communication with the high-pressure fuel pump, and one or more injectors that are in fluid communication with the fuel accumulator. Each of the fuel injectors is in fluid communication with a corresponding cylinder in which a piston is supported. Each of the injectors has a valve that opens or closes responsive to electrical pulses.

A controller, in electrical communication with the one or more of the injectors and the high-pressure fuel pump, generates a first signal responsive to which the valve in the injector opens or closes and a second signal responsive to which the high-pressure fuel pump increases or decreases the pressure level in the high-pressure fuel accumulator. The system may also include one or more sensors for detecting a temperature of an air manifold, a pressure within the air manifold, and a barometric pressure. The sensors generate data indicative of these parameters, which data is sent to the controller. The controller is programmed to estimate an in-cylinder gas density using data received from the sensors. The controller is in communication with a database having data representative of one or more predetermined in-cylinder gas densities that are associated with one or more predetermined parameters relating to the injection of fuel into the cylinder during an engine cycle, and responsive to one or more commands generated from the controller.

The term "in-cylinder gas density" as used in this disclosure shall mean the gas density within an engine cylinder when the valves are closed and the piston is at its top dead center position, or, depending on control strategy, when the piston is positioned immediately before fuel injection.

An embodiment of the invention may also be characterized as a method for controlling a fuel injection event in an internal combustion engine. The method comprises steps of detecting, from one or more sensors, a temperature of an air manifold, a pressure within the air manifold, and a barometric pressure, and generating, from the one or more sensors, one or more signals indicative of the temperature of the air manifold, the pressure within the air manifold, and the barometric pressure for sending data relative thereof to a controller. The invention may also comprise the steps of estimating, at the controller, an in-cylinder gas density of a cylinder using the data relative to the temperature of the air manifold, the pressure within the air manifold, and the barometric pressure; and, generating, in response to the estimation of the in-cylinder gas density and from the controller, one or more commands relative to fuel injection in the cylinder.

By calculating or estimating an in-cylinder gas density, a fuel system may consider or evaluate data that provides accurate information concerning what is taking place in the cylinder as compared to prior art systems that assumed that manifold air density is an accurate enough measurement to determine a fuel injection strategy. Combining this calculation with the flexibility of the common rail fuel injection timing and multiple injections leads to more efficient fuel consumption.

In another embodiment, the in-cylinder gas pressure may be calculated and used to formulate a fuel injection strategy in order to maintain $NO_x$ output and/or fuel consumption at an acceptable level or within an acceptable range by monitoring the in-cylinder pressure and maintaining that pressure within predetermined limits. A base fuel injection strategy may be provided for one or more engine loads and/or engine speeds, wherein the fuel injection strategy includes data relative to a fuel injection and fuel accumulator pressure. A fuel injection controller is programmed to select a fuel injection strategy from a database responsive to a calculated in-cylinder pressure that reaches or exceeds the predetermined maximum in-cylinder gas pressure. More specifically, a fuel injection timing is adjusted relative to a previously selected fuel injection timing and/or a fuel accumulator pressure is adjusted relative to a previously selected pressure in order to maintain $NO_x$ emissions of the engine and/or fuel consumption within designated/acceptable limits.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1:
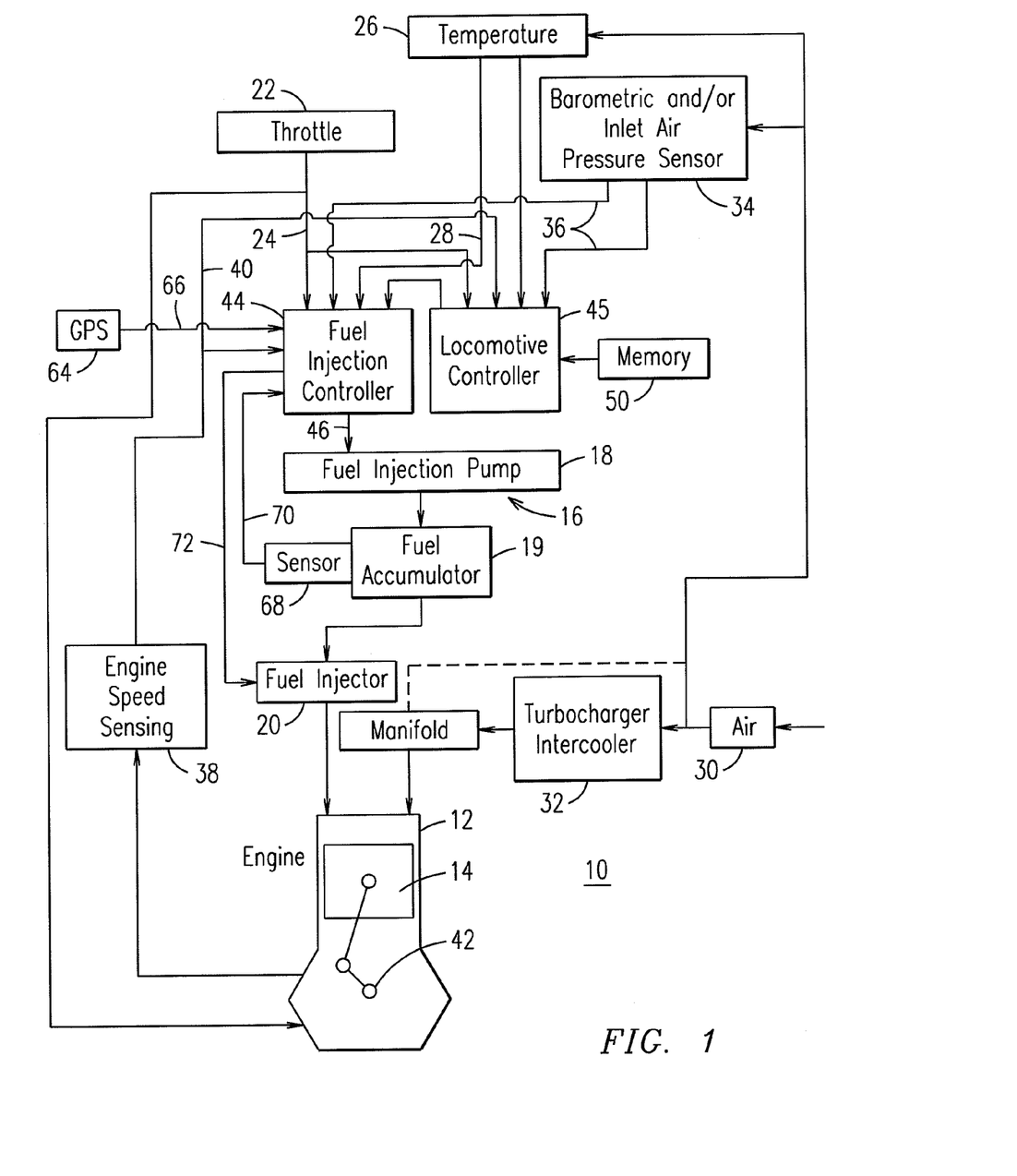
FIG. 1 is a schematic of an embodiment of the invention.

FIG. 1 is a schematic illustration of a diesel engine 10 using diesel or alternate liquid fuels and incorporating a fuel injection control scheme providing enhanced engine performance in varying environmental conditions. Engine 10 is representative of any large, medium-speed, multi-cylinder diesel engine such as may be used in locomotive, marine, or power generation applications. Engine 10 includes a plurality of power cylinders 12 (one illustrated) each having a piston 14 reciprocating therein. A fuel injection apparatus 16 injects fuel into the respective cylinders 12 in timed sequence with the reciprocation of the pistons 14. The fuel injection apparatus 16 may be of the common rail fuel system type, or other advanced high-pressure fuel system, and includes a fuel pump 18, a fuel accumulator 19 that stores fuel under pressure, and a fuel injector 20 associated with each cylinder 12. While the components 18, 19, and 20 are illustrated as separate parts these components may be integrated as a single component Each fuel injector 20 includes a valve that opens or closes responsive to commands 72 from a fuel injection controller 44. A pressure sensor 68 detects the fuel pressure within the accumulator 19 and generates signal 70, which is sent to the fuel injection controller 44. The fuel injection controller 44 controls a metering valve in the fuel system based on the pressure in the accumulator 19. The fuel injection controller 44 also controls a solenoid inside the injector to control, start, and stop fuel injections.

The engine 10 also includes an engine power and/or throttle position selection and sensing apparatus, collectively referred to herein as throttle 22. The throttle 22 provides a power demand signal 24 that is responsive to an operator throttle input. For locomotive engines, the throttle input will typically include a plurality of discrete throttle settings that are commonly referred to as notches "N", such as N1 thru N8, plus an idle setting. A temperature sensor 26 provides a temperature signal 28 responsive to a temperature of the air 30 being delivered to the engine 10 to support combustion. The temperature sensor 26 may be configured to measure the temperature of ambient air or inlet air entering the turbocompressor, or as indicated by the dashed line in FIG. 1, it may measure manifold air temperature downstream of a turbocharger/intercooler system 32. Alternatively, the temperature sensor may be configured to measure both ambient/inlet air temperature and manifold air temperature. One or more pressure sensors 34 provide one or more pressure signals 36 responsive to a detected ambient atmospheric pressure and a detected manifold air pressure. An engine speed sensor 38 provides an engine speed signal 40 responsive to the engine operating speed that corresponds to the rotating speed of the engine crankshaft 42, for example.

In an embodiment in which the engine 10 is used in a vehicle encountering varying environmental conditions such as changes in altitudes, the vehicle is equipped with a global positioning system (GPS) 64 that transmits a positioning signal 66. Such a signal may include data relative to an altitude of the vehicle.

The fuel injection controller 44 controls the fuel injection system 16 and components thereof. As described in more detail below, the fuel injection controller 44 generates one or more command signals 46 that control a fuel injection event of the engine 10. A locomotive controller 45 is provided for controlling an engine speed and engine load using an imbedded software program to maintain the power demand requested by the throttle position 22 and to achieve a desired output performance. The fuel injection controller 44 and locomotive controller 45 may be any style of controller known in the art, and are typically a computer or microprocessor configured to execute programmed instructions stored on a computer readable medium, for example memory 50 which may be a hard or floppy magnetic disk, a laser readable disk, a memory stick, etc.

The fuel injection controller 44 receives the power demand signal 24 (relative to engine speed and load), the temperature signal or signals 28, the pressure signal or signals 36, and the engine speed signal 40 as inputs, among other signals. Signals 24 relative to engine load may be received directly from the throttle system 22 or the locomotive controller 45. Responsive to the signals relative to manifold temperature, manifold pressure, and the ambient air pressure, and upon executing programmed logic, the fuel injection controller 44 estimates an in-cylinder gas density, and then provides a control signal 46 representative of a fuel injection strategy to the fuel injection system 16. The fuel injection controller 44 generates data relative to parameters of the fuel injection event such as the timing (advance angle AA) of the injection, the number of injections made during an engine cycle, the duration of each injection, time interval between injections, and/or the pressure of fuel in the accumulator. In order to optimize the injection strategy for the current operating condition, the fuel injection controller 44 may also adjust other engine performance parameters, such as engine speed or horsepower. The fuel injection controller 44 then sends commands to the fuel injection pump 18 and the fuel injector 20 to execute the injection strategy. The advance angle is the position of the crankshaft 42 at which the fuel injection is initiated for a given cylinder 12 expressed in degrees of rotation before a top-dead-center position of the respective piston 14. Another embodiment of the control logic is to reassess the injection control signals 46 and make adjustments based on the in-cylinder gas density at the selected start of injection rather than that estimated for the piston at the top dead center position.

The controller 44 is programmable to estimate the in-cylinder gas density using the following Ideal Gas Law equation:

$$\rho_{ref} = \left[ \frac{P_{ref}}{R * T_{ref}^{10}} \right]$$

where $\rho_{ref}$ represents the reference density. R represents a gas constant of the operating fluid, which is generally air, but could reflect other gas compositions, such as air and recirculated exhaust gas. $P_{ref}$ represents absolute reference pressure, which is determined by adding the barometric pressure and the manifold air pressure, if the manifold air pressure sensor is a gage sensor. $T_{ref}$ represents the reference temperature or the manifold temperature in absolute temperature units.

Then the in-cylinder gas density used for the control logic is calculated from:

$$\rho_{in\text{-}cylinder} = \rho_{ref} * \frac{V_{ref}}{V} * \eta_{vol}$$

where $\rho_{in\text{-}cylinder}$ represents the in-cylinder gas density used for the selection of the injection control strategy. $V_{ref}$ represents the reference cylinder volume consistent with the above reference conditions which would be the cylinder 12 volume at the point of intake valve closing. V represents the volume selected for estimating the in-cylinder gas density. The volume of the cylinder 12 at its top dead center position may be selected for one embodiment of the invention, or, in another embodiment of the control, the V may represent the volume of the cylinder at the selected time of fuel injection or other selected crank position reference points. The symbol $\eta_{vol}$ represents an empirical coefficient to account for the volumetric efficiency of the cylinder. The value of $\eta_{vol}$ may be set to a fixed value or changed with engine operation as determined from experimental data for controller calibration. Typical values of $\eta_{vol}$ range from 0.88 to 0.99.

By combining the two equations above, referencing the density at bottom dead center (V=$V_{ref}$), and multiplying by the volume displacement rate of a four-stroke engine (D*N/2), the mass flow of air into the cylinder can be estimated by:

$$\dot{m}_{in} = \left[ \frac{\eta_{vol} * D * N * P_{ref}}{2 * R * T_{ref}} \right]$$

The $\dot{m}_{in}$ represents the estimated flow rate of air into the cylinder.

The D is a constant that represents the volumetric displacement of air by a piston measured from a bottom dead center position in the cylinder to a top dead center position. The N represents the engine rotational speed. The $P_{ref}$ is the absolute manifold pressure. In the denominator of this equation, the R represents a gas constant for the operating fluid, which is generally air but could reflect other gas compositions, such as air and recirculated exhaust gas; and the $T_{ref}$ is the manifold temperature in absolute units.

For a predetermined in-cylinder gas density and/or altitude the fuel injection controller 44 generates a control signal 46 indicative of a fuel injection strategy associated with the in-cylinder density and/or altitude. Programmed logic for accomplishing such a control scheme may be implemented with an embedded software program by storing a series of look-up tables in memory 50 accessible by the controller 44. Control values for fuel injection timing, the number of fuel injections in an engine cycles, the duration of each injections, time interval between injections, and the fuel accumulator pressure are stored in respective look-up tables for a plurality of in-cylinder densities or altitudes and/or combinations of in-cylinder gas densities and altitudes. Distinct control values or parameters of a fuel injection strategy may be provided for distinct in-cylinder gas density or altitude levels. These control values may be calculated to produce optimal engine performance using known numeric models of the combustion process and/or developed algorithms for the outputs as functions of those input variables, or they may be derived from empirical data.

Figure 2:
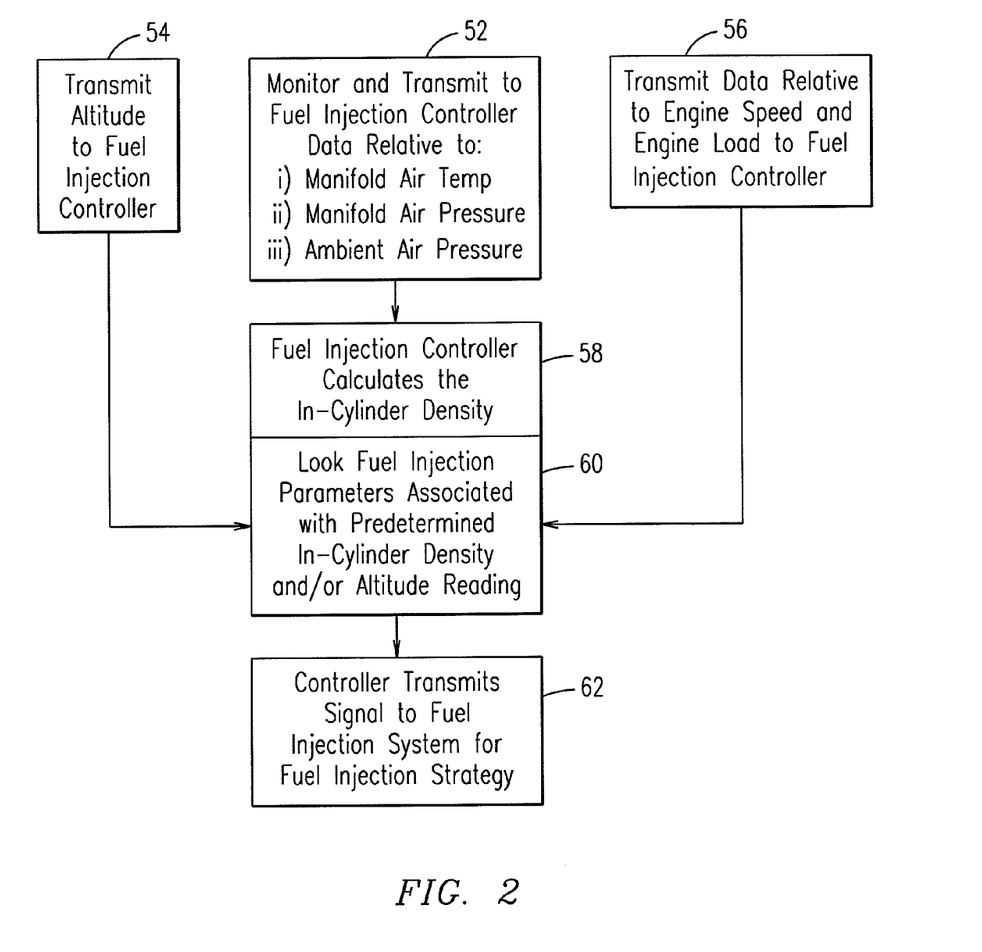
FIG. 2 is a flow diagram representing steps followed in an embodiment of the invention.

In one embodiment, such as an application with discrete speed/power settings such as a locomotive, the present invention includes programmed logic implementing a method of controlling engine 10 as represented in the flow chart in FIG. 2. At step 52 the method includes monitoring the manifold temperature, manifold pressure, and the pressure of the ambient air 30 and transmitting a temperature signal 28 and a pressure signal 36 to fuel injection controller 44. In addition, at step 54 data relative to the altitude or geographic location at which the engine 10 is operating is sent to the fuel injection controller 44 via control signal 66 from a global positioning system 64. In step 56, which may occur simultaneously with step 52 and/or step 54, data indicative of engine speed and load is generated and sent to the controller 44, which data may be sent via control signals 40 and 24 respectively.

As to step 58, the fuel injection controller 44 then calculates the in-cylinder gas density using the data relative to the air manifold temperature and pressure and the ambient air pressure. As mentioned above, and in reference to step 60, the fuel injection controller 44 has access to a memory 50 and/or database that includes one or more predetermined in-cylinder gas densities and/or altitudes that are associated with one or more control values or parameters relating to a fuel injection strategy. Such parameters may include fuel injection timing, the number of injections per engine cycle, the duration of each fuel injection, time interval between injections, and the fuel accumulator pressure. The data relating to the calculated in-cylinder gas density and detected altitude are compared to the predetermined values of these parameters stored in the memory 50. For those predetermined in-cylinder gas density values and/or altitudes that match, or ranges within which the calculated in-cylinder gas densities and/or detected altitudes fall within, the controller selects the one or more associated fuel injection control values or parameters. In addition, as the fuel controller 44 has received data relative to the operating engine load and engine speed, these parameters may be adjusted as necessary to achieve the desired fuel consumption and emissions. Accordingly, in step 62 the fuel injection controller 44 transmits a signal 46 to the fuel injection system 16, which signal 46 is indicative of the selected fuel injection strategy including the fuel injection control values. In contrast to prior art fuel injection systems for locomotives, the fuel accumulator pressure in the present system and injection strategy can be adjusted independent of other fuel injection parameters.

In an embodiment, the fuel injection strategy may be varied for altitudes above a predetermined height, such as above 7,000 feet (2134 meters) above sea level, for example. One or more restrictive operational limitations, such as an exhaust emission limit or fuel efficiency, may be relaxed above a predetermined altitude. By relaxing a limiting design restriction in only such extreme environmental conditions, the benefit of maximizing engine power output while staying within mechanical and thermal loading limits may be found to be beneficial. In the example of relaxed fuel efficiency at high altitude, the locomotive operator may find it beneficial to use maximum horsepower to increase train speed. Another example may be that when the locomotive is determined to be in a tunnel, by GPS or onboard sensor readings indicative of entering a tunnel, an injection strategy can be used that maximizes power to minimize power duration in the tunnel.

Figure 3:
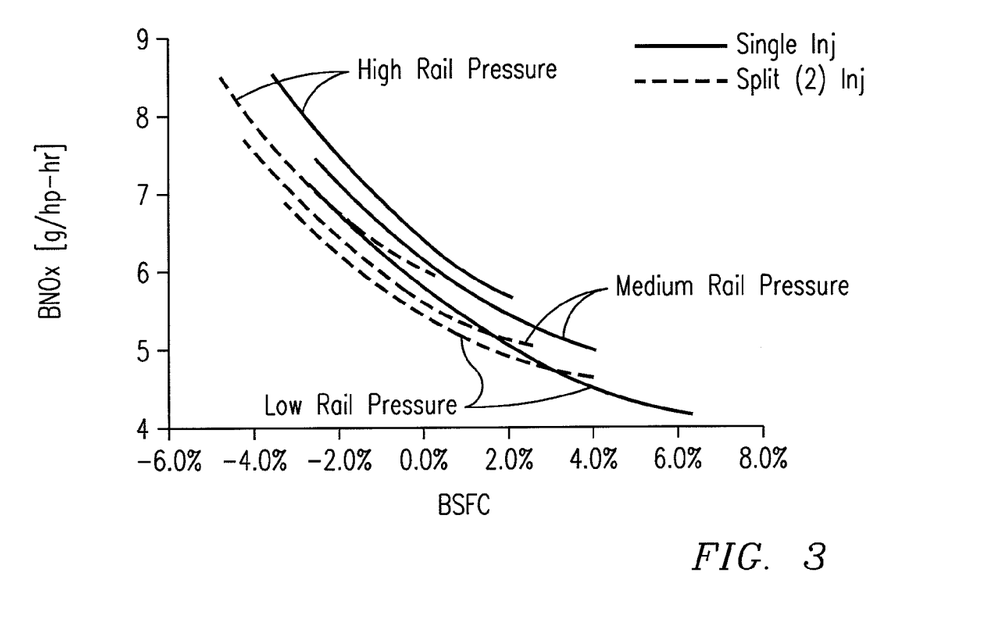
FIG. 3 is a graph having nitrous oxide ($NO_x$) emissions plotted versus fuel consumption for injections made at different injection pressures.
Figure 4:
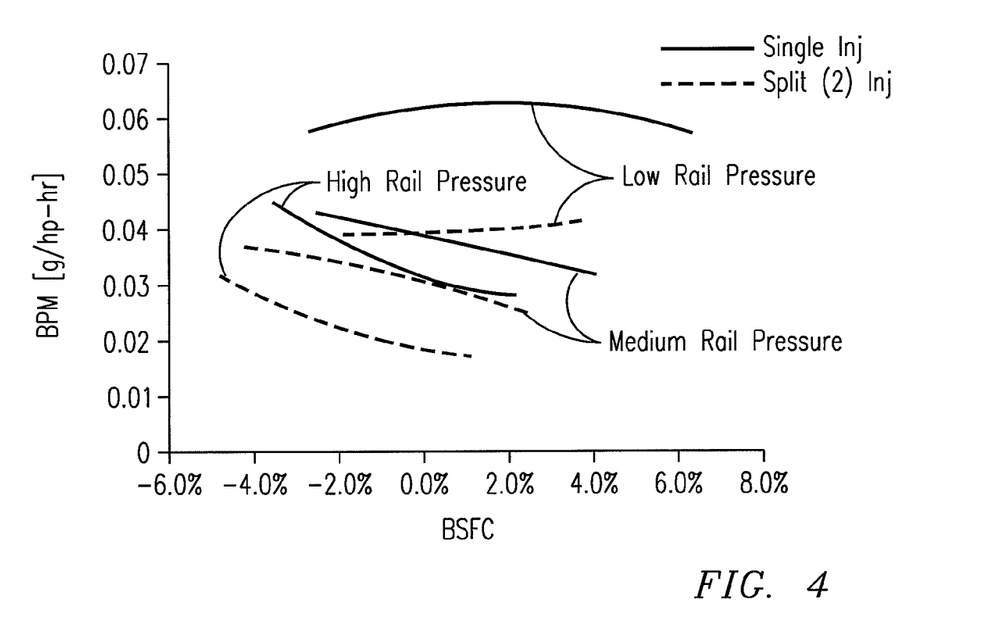
FIG. 4 is a graph having particulate matter emissions plotted versus fuel consumption for injections made at different injection pressures.

With respect to the graphs in FIGS. 3 and 4, there is demonstrated the efficacy of varying injection pressures and the number of injections on fuel consumption and emissions. The tests were conducted on a common rail fuel injection system that injected fuel into a single high-flow test cylinder. The engine was operating at an intermediate speed and load.

In FIG. 3, injections were made at three different pressures representing high, medium and low accumulator pressures. For each injection pressure a single injection and a split (two injections) injection were made. The brake specific fuel consumption (fuel flow rate divided by brake power) was measured and is plotted on the horizontal axis; and, the brake specific $NO_x$ emissions (mass flow rate of NOx divided by brake power) were measured and are plotted on the vertical axis. Each of the curves shown in FIG. 3 represents several data points which are injection events. All data points were normalized to an arbitrary baseline so that the fuel consumption is expressed as a percentage of that baseline. For example, for a single curve there were three data points which were averaged to determine the baseline from which the remaining data points were plotted. The same was done for preparation of the graph in FIG. 4

As shown in this graph, brake specific fuel consumption and brake specific $NO_x$ emissions improved for both single injections and split injections as the fuel accumulator pressure was decreased. In addition, for each of the different fuel pressures the split injections showed an improved consumption and $NO_x$ emissions over the single injections.

In FIG. 4, injections were made at three different pressures representing high, medium and low accumulator pressures. For each injection pressure a single injection and a split (two injections) injection were made. The brake specific fuel consumed (fuel flow rate divided by brake power) was measured and is plotted on the horizontal axis; and, the brake specific particulate matter emissions (mass flow rate of particulate matter divided by brake power) were measured and are plotted on the vertical axis. As shown in this graph, fuel consumption and particulate matter emissions improved for both single injections and split injections as the fuel accumulator pressure was increased. In addition, for each of the different fuel accumulator pressures the split injections showed an improved consumption and particulate matter emissions over the single injections.

As a vehicle may travel long distances at various altitudes, the air manifold pressure and in-cylinder gas density will change. These changing parameters may directly affect the efficiency of fuel consumption and emissions. While prior art fuel injection systems such as the unit pump systems considered air manifold pressure, such systems did not factor in the in-cylinder gas density. Moreover, such systems could control only the timing and duration of the injection, and were limited to a single injection during an engine cycle. In addition, fuel injection pressure could not be controlled independent of other parameters. In embodiments of the disclosed invention parameters in an injection strategy are controlled independent of one another; therefore, factoring in the in-cylinder gas density and the altitude at which an engine is operating may more effectively control fuel consumption and emissions in an internal combustion engine over a wide range of operating conditions.

In another embodiment related to the estimation of the in-cylinder gas density, the in-cylinder gas pressure may be calculated and used to formulate a fuel injection strategy in order to maintain $NO_x$ output at an acceptable level or within an acceptable range by monitoring the in-cylinder pressure and maintaining that pressure within predetermined limits. More specifically, a base fuel injection strategy is formulated for a full or rated engine power output and/or rated engine speed. For example, this minimum engine power output may be associated with a particular notch setting. As shown in FIG. 1, a locomotive may include a throttle 22 that is adjusted (manually or automatically) to different power output settings or notches. Typically, a locomotive operating system includes eight notches and for each notch there is an expected power output and engine speed. The operating notch is selected based on the power needed to move the train at a desired speed given various parameters such as track grade and/or curvature etc.

According to embodiments of the subject invention, an increase in the notch setting results in increased engine power output and/or engine speed, and the gas pressure within the cylinders will increase as well, which absent an adjustment in a fuel injection strategy may also result in increase $NO_x$ output. This increase in engine power output in conjunction with changes in other operating conditions such as ambient temperature, altitude, barometric pressure etc. may result in changing in-cylinder conditions, for example an increase in the in-cylinder gas pressure. In order to avoid the increase in $NO_x$ emissions output, it has been found that the timing of an injection may be delayed, relative to the top-dead center of a piston, in order to maintain $NO_x$ emissions at predetermined acceptable levels. In addition, the pressure within the fuel accumulator may be increased to maintain the level $NO_x$ emissions responsive to an increase in in-cylinder gas pressure, engine power output, or engine speed.

Figure 5:
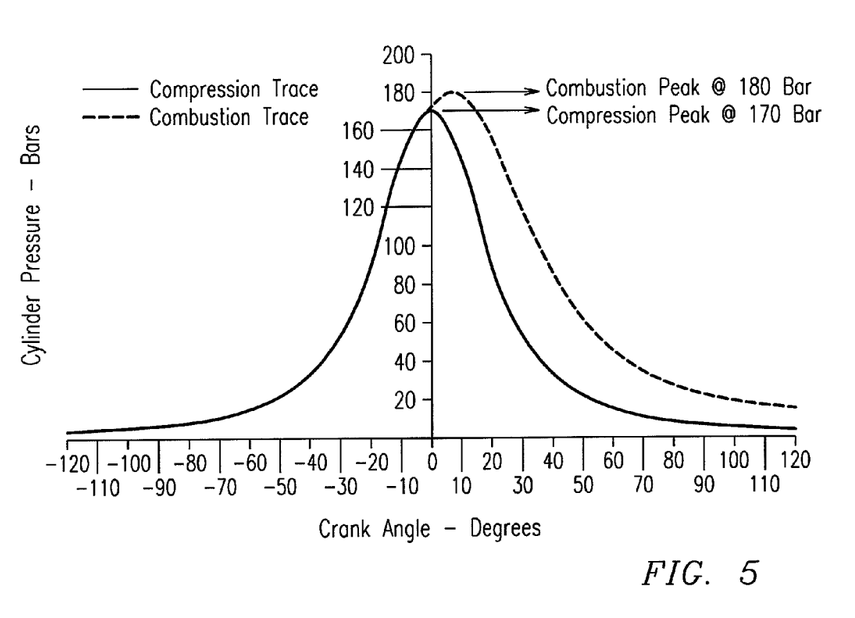
FIG. 5 is a graph illustrating the components for determining the peak cylinder pressure, including the combustion peak and compression peak.

The in-cylinder gas pressure can be viewed as having two components. These two components are illustrated in the graph shown in FIG. 5. The first component considers only the compression of the trapped in-cylinder air from the point where air is trapped (i.e., when intake valves first close), to top dead center where the volume in the cylinder is smallest. With reference to FIG. 5, the solid line represents the compression of air in the cylinder. Since this component is simply the effect of compressing a trapped gas, the Ideal Gas Law (provided in paragraph 29 above) is used to calculate the peak pressure in terms of compression ratio. The second component is the additional pressure that is generated from the combustion process. This component is a function of the start of combustion. The combustion component is represented by the dashed line in FIG. 5. If combustion is occurring near top dead center, then the combustion process increases cylinder pressure beyond the normal compression pressure. If the start of combustion is happening a sufficient time after top dead center, it will not further increase peak cylinder pressure, and the compression peak will govern the peak cylinder pressure. As shown in the graph, for example, if the injection timing is delayed relative to a top dead center position of the piston, the peak cylinder pressure will decrease. The combustion component is empirically determined, and is very specific to the engine and running conditions. It is possible that if the injection timing is adjusted to such a point that the compression component may cause the in-cylinder gas pressure to increase and exceed a predetermined maximum limit. In such a case the injection timing may be adjusted so that is made closer to top dead center to decrease in-cylinder gas pressure below a predetermined pressure limit.

The in-cylinder gas pressure can be calculated according to the following algorithms:

$$PCP = PCP(comp) + (Combustion\ Adder) \quad (1)$$

$$PCP = MAP(CR\_eff)^\alpha + (K1 + K2 * AA * P\_rail) \quad (2)$$

where:
MAP is a detected manifold air pressure;
Cr_eff is the effective compression ratio;
$\alpha$ is the Polytropic Gas Constant (1.35);
K1 and K2 are constants;
AA is the injection timing; and,
P_rail is the detected Pressure in the Fuel Accumulator.

The acronym PCP stands for operating peak in-cylinder gas pressure and PCP(comp) refers to a compression component of the equation while Combustion Adder is the combustion component of the equation. Also note that this equation is limited to injection timings advanced enough to have the combustion peak govern the peak cylinder pressure. At more retarded injection timings, the combustion term will be zero.

One major constraint when defining a fuel injection strategy at full power is peak cylinder pressure. Cylinder pressure changes in real operation as a function of intake manifold air pressure, as can be seen in Equation (2) above. These intake manifold air pressure changes can be caused by changes in altitude, barometric pressure, turbo health, manifold air temperature, etc. So, the performance recipe needs to be set so that peak cylinder pressure is met at some typical operating conditions, and when it goes outside of those conditions, some adjustments can be made. Currently, locomotives reduce power output based on specific ambient conditions in an attempt to keep within cylinder pressure limits. This is typically a predetermined power limit based on ambient conditions or manifold air pressure, with no attempt to calculate peak cylinder pressure. Another approach to controlling peak cylinder pressure is to retard timing based on ambient conditions, but this also negatively effects fuel consumption. Embodiments of the invention look at calculating peak cylinder pressure and adjusting timing and rail pressure to control cylinder pressure while keeping $NO_x$ constant. This provides the best possible fuel consumption. One simple implementation of this invention is to raise injection pressure and retard timing to predetermined levels as described below.

Figure 6:
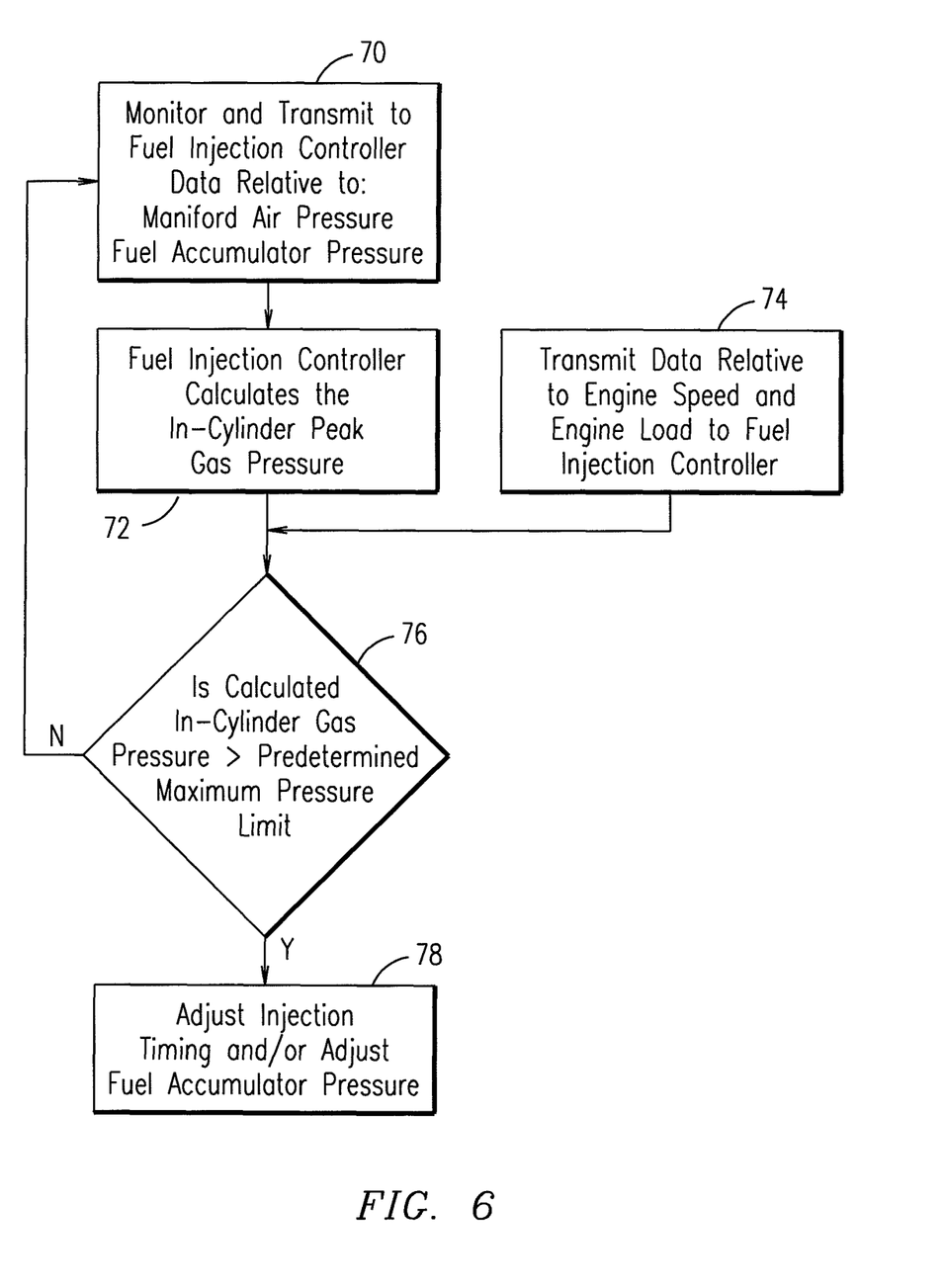
FIG. 6 is a flow chart describing steps of an embodiment of the invention.

In operation and according to the flow chart in FIG. 6, in step 70 sensors 34 and 68 monitor the pressure in the air manifold and fuel accumulator 19, respectively, and transmit signals indicative of the air pressure in the air manifold and pressure within the fuel accumulator 19 respectively to the fuel injection controller 44. In step 72, the controller 44 is programmed to, using the above algorithms, calculate the PCP or what may be referred to as an operating peak in-cylinder gas pressure. In addition, at step 74 the engine power output (or engine load) and engine speed may be monitored using known monitoring or detecting systems, such as detectors that monitor voltage or amperes output of an alternator that drives an engine. Signals indicative of the engine power output and engine speed are transmitted to the controller 44 for determining an appropriate fuel injection strategy considering one or more of the operating parameters including the in-cylinder gas pressure, engine power output, and/or engine speed.

As set forth in step 76, the controller 44 determines whether the calculated operating peak in-cylinder gas pressure exceeds a predetermined maximum cylinder pressure limit that is associated with the engine power output. If the calculated operating peak in-cylinder gas pressure does not, changes are not made to either fuel injection timing or pressure at the fuel accumulator (which may also be referred to rail pressure or fuel injection pressure). If the calculated operating peak in-cylinder gas pressure exceeds the predetermined maximum cylinder pressure limit, then the controller 44, at step 78, transmits a signal responsive to which the fuel accumulator pressure is adjusted and/or injection timing is adjusted relative to a top dead center position of the piston as needed. The calculation of step 72, and the determination at step 76, may involve an in-cylinder gas pressure other than the operating peak in-cylinder gas pressure.

Figure 7A:
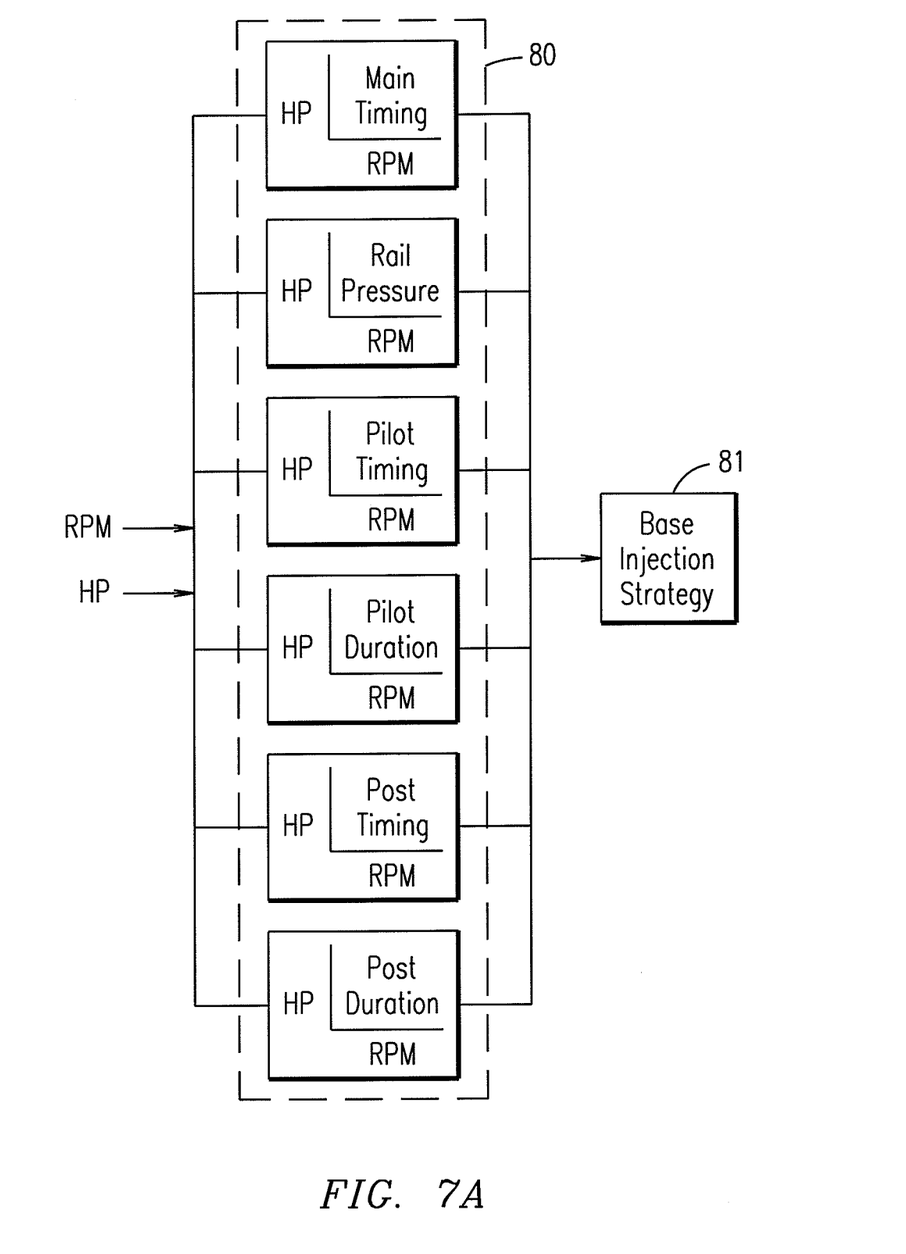
FIG. 7A is a schematic diagram describing a database that includes data relative to a base injection strategy.

In an embodiment, a fuel injection strategy may be developed for one or more engine power outputs (also referred to as "engine load" or "notch settings") that include discrete adjustments in fuel injection timings that may associated with discrete adjustments in pressure at the fuel accumulator. As shown in FIG. 7A, a database 80 is provided that includes base injection strategies for a plurality of different engine loads and engine speeds. For example, a locomotive may operate at different engine loads including different notch settings N1 through N8 (also referred to as horsepower "HP"), wherein for each engine load there is an associated engine speed ("RPM"). For each engine load and associated engine speed there is a base injection strategy that may include data relative to fuel injection timing and duration for main, pilot, and/or post injections and data relative to rail pressure. Thus, as engine power (notch setting or HP) and engine speed are detected and input, the fuel injection controller selects the base injection strategy 81 associated with the engine power and engine speed.

Figure 7B:
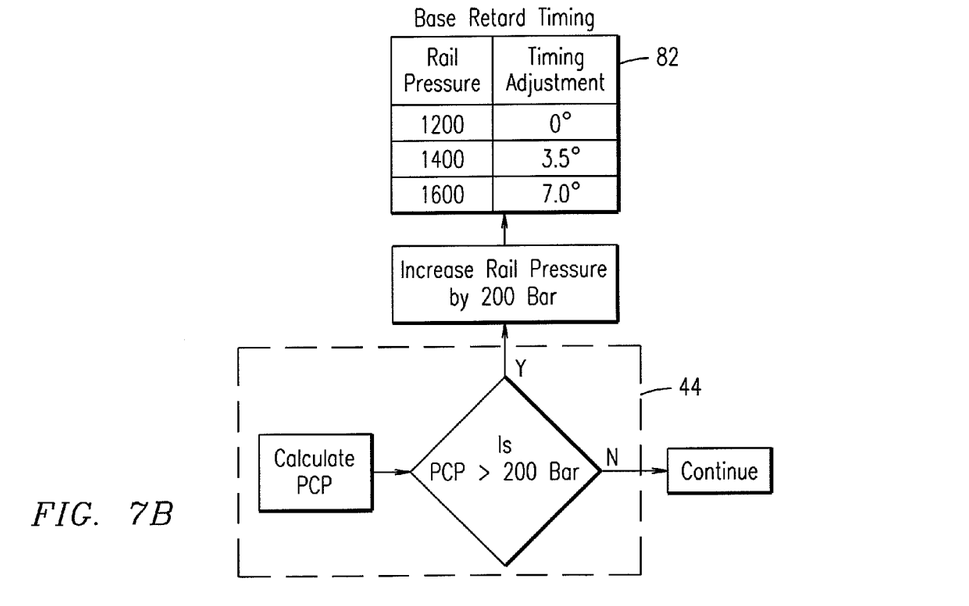
FIG. 7B is a schematic diagram of the controller and database providing modified injection strategies when the peak cylinder pressure exceeds a predetermined maximum pressure.

In some instances at a maximum power output (or maximum notch setting, N8), the in-cylinder gas pressure or operating peak in-cylinder gas pressure (PCP) may exceed a predetermined limit, in which case the injection timing and/or rail pressure may be adjusted to drop the in-cylinder gas pressure below the maximum limit. Accordingly, another or second database 82 (shown in FIG. 7B) may be provided that includes data relative to a fuel injection strategy for an engine power output that adjusts the fuel injection timing and/or the in-cylinder gas pressure below a maximum limit while maintaining $NO_x$ emissions and fuel consumption at an acceptable level. By way of example, the fuel injection strategy data for a given engine power output data (e.g., notch setting N8) includes a plurality of different fuel injection timings wherein each injection timing is associated with a fuel accumulator (rail) pressure. For example, when the engine is operating at a power setting of N8, the fuel accumulator pressure is at 1200 bar and the fuel injection timing is 16° before top dead center, the in-cylinder gas pressure should be below a maximum pressure limit of 200 bar. However, operating at different ambient conditions such as altitude, temperature, barometric pressure, etc. may change, causing the in-cylinder gas pressure to exceed 200 bar. In such a case, the controller 44 may select the next incremental change (delay) in fuel injection timing to reduce the in-cylinder gas pressure, and increase injection pressure to maintain $NO_x$ emissions and fuel consumption at an acceptable level. For example, the controller 44 may select a strategy in which the injection timing is 12.5° (or changing previous timing by 3.5°) before top dead center and the fuel accumulator pressure is increased to 1400 bar. To that end, the controller 44 may be programmed to simply adjust the rail pressure and/or injection timings for some predetermined increments (e.g., 200 bar for rail pressure and 3.5° for injection timing) each time the peak cylinder pressure exceeds the predetermined limit. The controller 44 may be programmed to sequentially select the fuel injection strategy, discretely increasing (or decreasing) the fuel accumulator pressure and/or adjusting the injection timing, relative to a previously selected fuel injection strategy, each time the in-cylinder gas pressure exceeds the maximum limit.

Figure 7C:
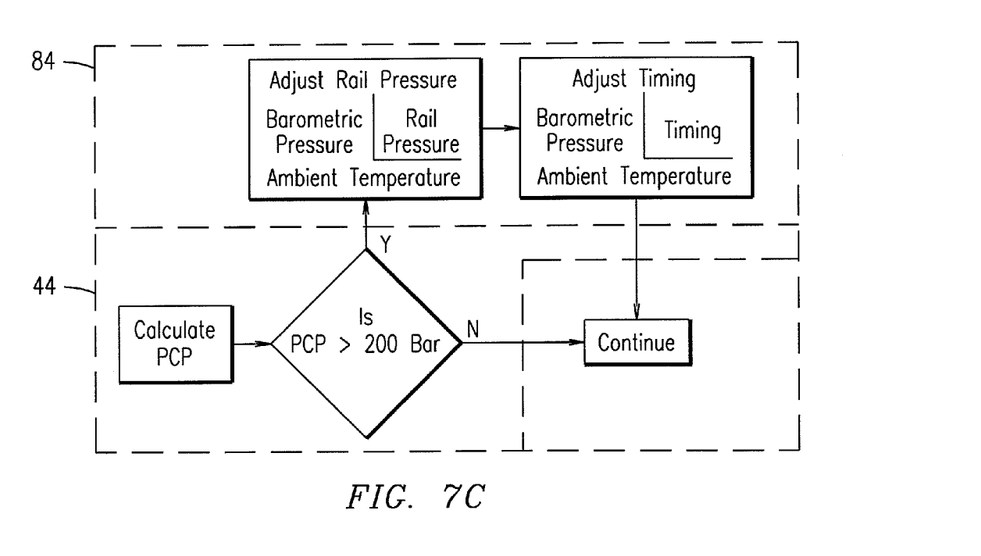
FIG. 7C is an embodiment of the invention utilizing data relating to ambient conditions to develop an injection strategy.

In another embodiment, the controller 44 may receive data/ signals relative to certain above-described parameters such as altitude, ambient temperature, barometric pressure, etc. A database 84, as shown in FIG. 7C, may be configured such that there is a fuel injection timing and fuel accumulator pressure associated with various operating conditions. For example for a given ambient temperature (e.g., 80° F.) and altitude (1000 ft.) there may be a fuel injection timing (or range of timings) and a fuel accumulator pressure (or range of pressures) for which the in-cylinder gas pressure is expected to be below the maximum pressure limit. Instead of sequentially selecting the fuel injection strategy from a base strategy, the controller 44 may parcel through the data of database 84 to select the strategy associated with the operating conditions.

Figure 8:
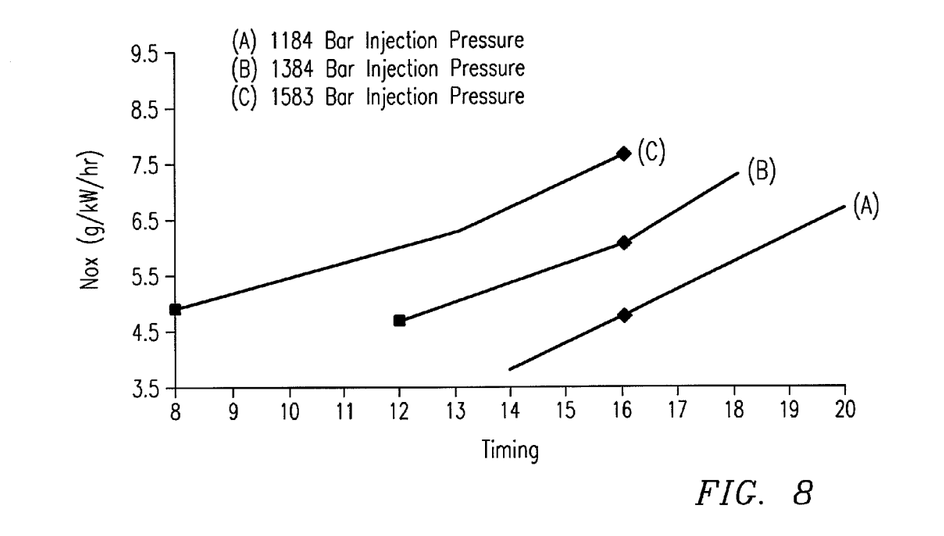
FIG. 8 is a graph schematically illustrating test results of an embodiment of the invention.

In reference to FIG. 8, there is a graph showing test results of adjusted fuel injection timing plotted versus $NO_x$ emissions (g/kW/hr). A General Electric 16-cylinder P616 engine operating at notch setting N8 was tested for $NO_x$ emissions at different in-cylinder gas pressures. The engine was operated using a base injection strategy for notch N8 that included a fuel injection timing of 16 degrees before top-dead center when the pressure in the fuel accumulator was about 1200 bar. This strategy produced $NO_x$ emissions of about 4.7 g/kW/hr (about 0.1658 ounce/kW/hr), as represented by the diamond symbol. As the timing of the fuel injection is adjusted the $NO_x$ emissions changed accordingly. This injection strategy is illustrated by the line A plotted on the FIG. 8 graph.

Again in reference to FIG. 8, a predetermined maximum in-cylinder gas pressure was set at 200 bar. In normal N8 conditions with the calculated peak cylinder pressure less than 200 bar, the base emissions performance recipe was defined with a fuel injection timing set at 16 degrees before drop dead center and an injection pressure of 1200 bar. This produced a $NO_x$ emissions around 4.7 g/kW/hr (around 0.1658 ounce/kW/hr) as represented by the diamond symbol on the plotted line A. Under some standard set of ambient conditions, say 80° F. and 1000' altitude, a peak cylinder pressure of 190 bar would be expected. In operation of the locomotive, conditions change causing an increase in manifold air pressure, which results in an increase in peak cylinder pressure. For example, the ambient temperature may drop to 30° F., causing an increase in manifold air pressure and a cylinder pressure increase to 200 bar. Upon detection of the 200 bar cylinder pressure, the controller changes the accumulator pressure from about 1200 bar to about 400 bar, represented by the diamond on line B of FIG. 8. If the injection timing is left at 16 degrees, the NOx would increase to approximately 5.8 g/kW/hr (approximately 0.2046 ounce/ kW/hr). In order to keep NOx constant at 4.7 g/kW/hr (at 0.1658 ounce/kW/hr), injection timing is retarded to 12.5 degrees, which is shown as the square point on line B of FIG. 7. The timing retard to 12.5 degrees is expected to reduce peak cylinder pressure from 200 bar to approximately 182 bar. If the new 12.5 degree timing and 1400 bar accumulator pressure was not enough to get peak cylinder pressure below 200 bar, then another step can be taken by going to about 600 bar and 8 degree timing, as shown in FIG. 7 as the square on line C.

An alternate approach of implementation rather than using the discreet steps in injection timing and accumulator pressure is to use continuous adapting. When peak cylinder pressure is detected over 200 bar, timing and rail pressure can be changed in a PID control loop just enough to keep cylinder pressure at 200 bar and NOx constant. Another embodiment relates to a fuel injection system for controlling fuel injection in an internal combustion engine having an engine block with one or more cylinders within which fuel is injected. The fuel injection system comprises a controller, one or more sensors, and a database. The controller controls one or more fuel injectors in the engine, and also controls a pressure level in a fuel accumulator in the engine. The one or more sensors detect operating parameters of the engine. The controller is configured to calculate an in-cylinder pressure based on the detected operating parameters. The database includes data relative to a predetermined maximum in-cylinder gas pressure. The database further includes respective data relative to a plurality of fuel injection strategies, i.e., for each fuel injection data there is a set of data. The respective data relative to each fuel injection strategy includes data indicative of at least one timing of a fuel injection relative to a top-dead center position of a piston and/or data relating to at least one pressure in the fuel accumulator. The controller is programmed to select a fuel injection strategy from the database, where the selection is responsive to the calculated in-cylinder pressure being at or above the predetermined maximum in-cylinder gas pressure. According to the selected fuel injection strategy, a selected timing of a fuel injection is adjusted relative to a previously selected fuel injection timing and/or a selected pressure in the fuel accumulator is adjusted relative to a previously selected pressure. In other words, if the calculated in-cylinder pressure is at or above the predetermined maximum in-cylinder gas pressure, the controller selects a fuel injection strategy (having data of at least one timing of a fuel injection relative to a top-dead center position of a piston and/or data relating to at least one pressure in the fuel accumulator), and adjusts fuel injection and/or fuel accumulator pressure accordingly.

While various embodiments of the present invention have been shown and described herein, it will be obvious that such embodiments are provided by way of example only. Numerous variations, changes and substitutions will occur to those of skill in the art without departing from the invention herein. Therefore, it is intended that the invention not be limited to the particular disclosed as the best mode contemplated for carrying out this invention, but that the invention will include all embodiments falling within the scope of the appended claims.

What is claimed is:

1. A fuel injection system for controlling fuel injection in an internal combustion engine having an engine block with one or more cylinders within which fuel is injected, the fuel injection system comprising:
   a controller for controlling one or more fuel injectors in the engine and for controlling a pressure level in a fuel accumulator in the engine;
   one or more sensors for detecting operating parameters of the engine;
   wherein the controller calculates an in-cylinder pressure based on the detected operating parameters;
   a database that includes data relative to a predetermined maximum in-cylinder gas pressure, wherein the database further includes respective data relative to a plurality of fuel injection strategies, the respective data relative to each fuel injection strategy including data indicative of at least one timing of a fuel injection relative to a top-dead center position of a piston and/or data relating to at least one pressure in the fuel accumulator; and
   the controller is programmed to select a fuel injection strategy from the database responsive to the calculated in-cylinder pressure being at or above the predetermined maximum in-cylinder gas pressure, wherein according to the selected fuel injection strategy a selected timing of a fuel injection is adjusted relative to a previously selected fuel injection timing and/or a selected pressure in the fuel accumulator is adjusted relative to a previously selected pressure.

2. A fuel injection system for controlling fuel injection in an internal combustion engine having an engine block with one or more cylinders within which fuel is injected, the fuel injection system comprising:
   a fuel pump in fluid communication with a fuel reservoir;
   a fuel accumulator, in fluid communication with the fuel pump;
   one or more injectors that are in fluid communication with the fuel accumulator and each of the fuel injectors are in fluid communication with a corresponding cylinder in which a piston is supported;
   the one or more injectors each having a valve that opens or closes responsive to electrical pulses;
   one or more air manifolds in fluid communication with the cylinders for delivery of air to the cylinders;
   a controller, in electrical communication with the one or more of the injectors and the fuel pump that, during operation of the engine, generates one or more first signals responsive to which the valve in the injector opens or closes and one or more second signals responsive to which the fuel pump increases or decreases a pressure level in the fuel accumulator;
   one or more sensors for detecting operating parameters including an air pressure within the air manifold and a pressure within the fuel accumulator, wherein the one or more sensors send data, indicative of the air pressure within the air manifold and pressure within the fuel accumulator, to the controller;
   wherein the controller calculates an in-cylinder pressure based on the detected pressure within the air manifold and the detected pressure within the fuel accumulator;
   a database that includes data relative to a predetermined maximum in-cylinder gas pressure, wherein the database further includes data relative to a fuel injection strategy, the data relative to the fuel injection strategy including data indicative of a plurality of different timings of a fuel injection relative to a top-dead center position of a piston and/or data relative to a plurality of different pressures in the fuel accumulator; and,
   the controller is programmed to select a fuel injection strategy from the database responsive to a calculated in-cylinder pressure that reaches or exceeds the predetermined maximum in-cylinder gas pressure, wherein according to the selected fuel injection strategy a selected timing of a fuel injection is adjusted relative to a previously selected fuel injection timing and/or a selected pressure in the fuel accumulator is adjusted relative to a previously selected pressure, whereby $NO_x$ emissions of the engine and/or fuel consumption are maintained within designated limits.

3. The fuel injection system of claim 2, wherein the engine operates at a plurality of different engine loads and for each engine load the database includes data relative to a fuel injection timing and data relative to a pressure in the fuel accumulator.

4. The fuel injection system of claim 3, wherein the data relative to the different engine loads includes a maximum engine load, and the maximum in-cylinder pressure limit is associated with the maximum engine load, and the controller adjusts the fuel injection timing and/or the pressure in the fuel accumulator when the calculated in-cylinder pressure reaches or exceeds the maximum in-cylinder pressure limit at the maximum engine load.

5. The fuel injection system of claim 4, wherein the fuel injection timing data associated with the maximum engine load includes a plurality of different fuel injection timings that set at predetermined incremental changes in timing.

6. The fuel injection system of claim 4, wherein the fuel accumulator pressure data associated with the maximum engine load includes a plurality of different pressure settings that set at predetermined incremental changes in pressure.

7. A method for controlling fuel injection in an internal combustion engine mounted in a vehicle and having an engine block with one or more cylinders within which fuel is injected and provided from a fuel accumulator under pressure, wherein the engine further includes an air manifold for providing air to cylinders associated with the injectors, the method comprising the steps of:
- monitoring, from one or more sensors, an air pressure in the air manifold and a pressure within the fuel accumulator;
- transmitting, from the one or more sensors, one or more signals indicative of the air pressure in the air manifold and the pressure within the fuel accumulator to a fuel injection controller;
- calculating, at the fuel injection controller, an in-cylinder gas pressure using the data relative to the pressure within the air manifold and the pressure within the fuel accumulator; and,
- transmitting, in response to the calculated in-cylinder gas pressure, from the controller, one or more commands relative to a fuel injection strategy for each cylinder including commands associated with a timing of a fuel injection during a piston cycle, the number of injections, and the duration of each injection made during a piston cycle; and,
- wherein in response to the one or more commands from the controller, adjusting the timing of a fuel injection relative to a top-dead center position of the piston and relative to a previously selected fuel injection timing and/or adjusting the pressure in the fuel accumulator relative to a previously selected pressure, when the calculated in-cylinder gas pressure exceeds a predetermined maximum pressure limit, whereby $NO_x$ emissions of the engine and/or fuel consumption are maintained within designated limits.

8. The method for controlling fuel injection of claim 7, wherein the engine operates at a plurality of different engine loads including a maximum engine load, and the step of adjusting the timing of the fuel injection is performed when the engine is operating at the maximum engine load.

9. The method for controlling fuel injection of claim 8, wherein for each engine load the controller transmits one or more signals indicative of a fuel injection strategy including data relative to a fuel injection timing relative to a top dead center position of a piston and a fuel accumulator pressure.

10. The method for controlling fuel injection of claim 7, wherein the fuel injection timing is adjusted in predetermined increments each time the in-cylinder pressure reaches or exceeds the maximum pressure limit.

11. The method for controlling fuel injection of claim 10, wherein the engine operates at a plurality of different engine loads including a maximum engine load, and the step of adjusting the fuel accumulator pressure is performed when the engine is operating at the maximum engine load.

12. The method for controlling fuel injection of claim 11, wherein the fuel accumulator pressure is adjusted in predetermined increments each time the in-cylinder pressure reaches or exceeds the maximum pressure limit.

13. The method for controlling fuel injection of claim 11, wherein for each engine load the controller transmits one or more signals indicative of a fuel injection strategy including data relative to a fuel injection timing relative to a top dead center position of a piston and a fuel accumulator pressure.

* * * * *